Dec. 18, 1962 L. V. BLACK 3,068,672
APPARATUS FOR BENDING SHEET GLASS
Filed Feb. 17, 1958 6 Sheets-Sheet 1

INVENTOR.
LLOYD V. BLACK
BY
ATTORNEY.

Dec. 18, 1962 L. V. BLACK 3,068,672
APPARATUS FOR BENDING SHEET GLASS
Filed Feb. 17, 1958 6 Sheets-Sheet 2
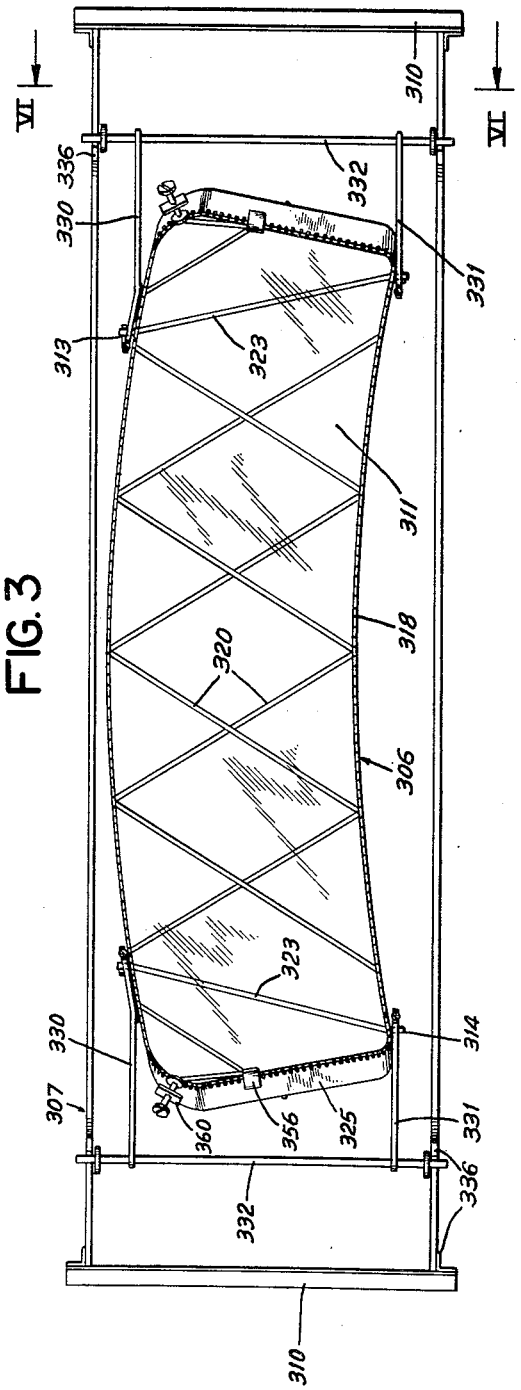
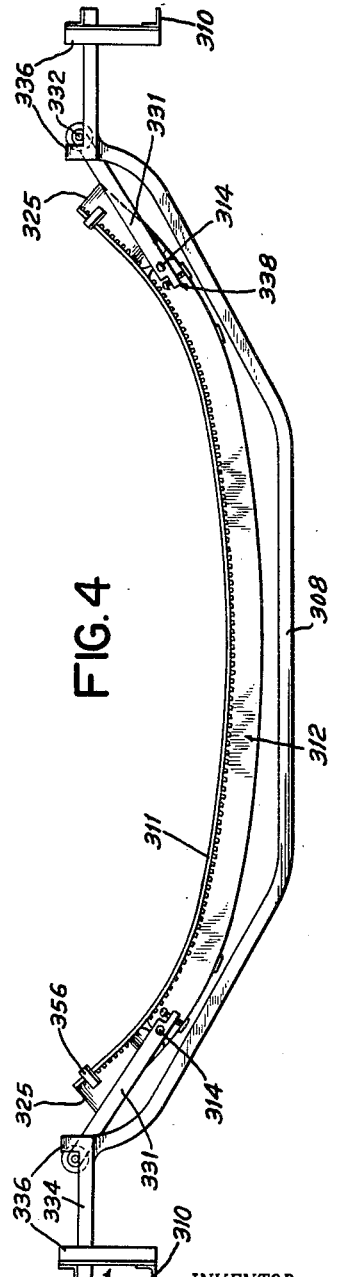
INVENTOR.
LLOYD V. BLACK
BY
ATTORNEY.

Dec. 18, 1962  L. V. BLACK  3,068,672
APPARATUS FOR BENDING SHEET GLASS
Filed Feb. 17, 1958  6 Sheets-Sheet 3

INVENTOR.
LLOYD V. BLACK
BY Oscar A. Spencer
ATTORNEY.

Dec. 18, 1962 L. V. BLACK 3,068,672
APPARATUS FOR BENDING SHEET GLASS
Filed Feb. 17, 1958 6 Sheets-Sheet 4
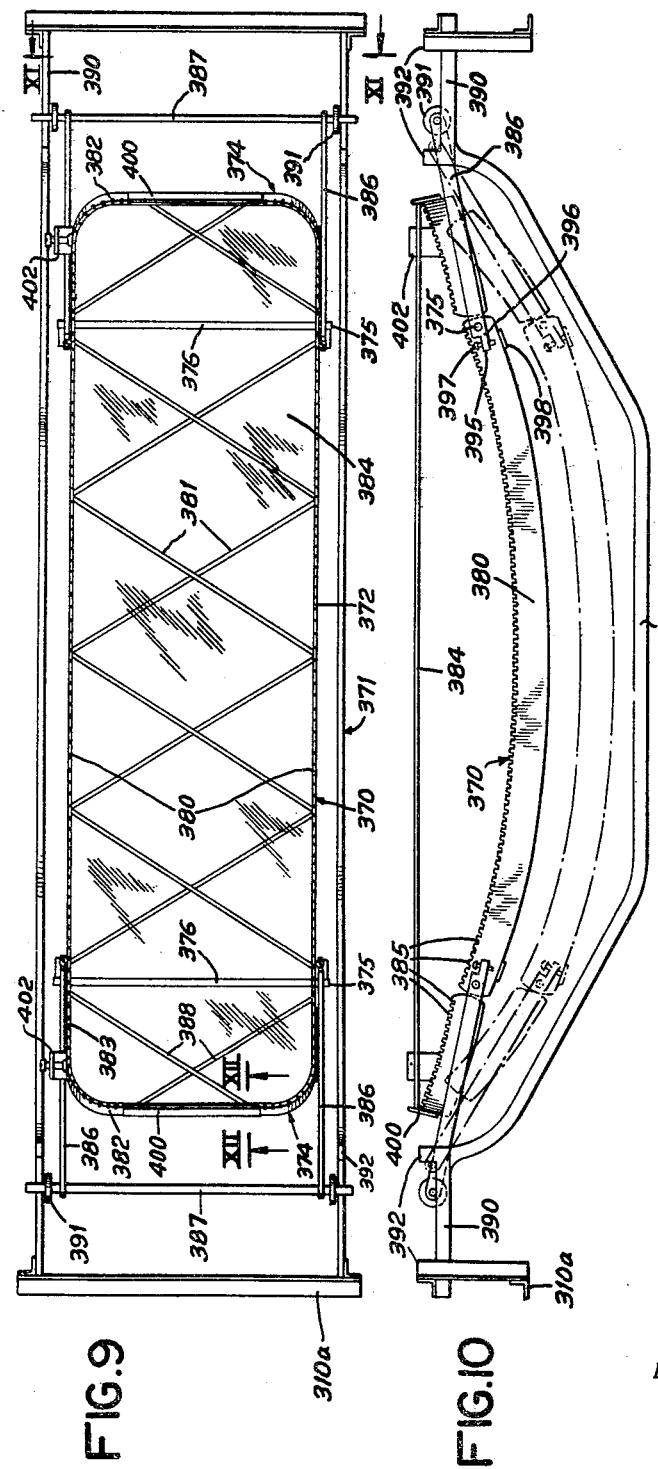
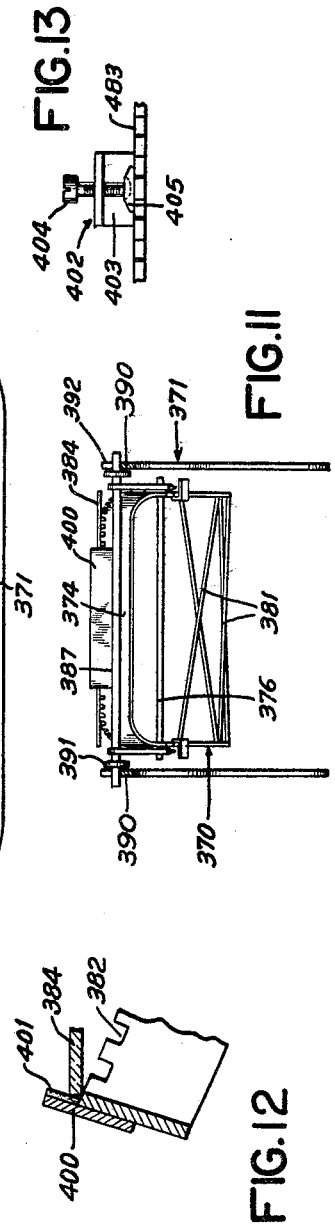
INVENTOR.
LLOYD V. BLACK
BY Oscar H Spencer
ATTORNEY.

Dec. 18, 1962 L. V. BLACK 3,068,672
APPARATUS FOR BENDING SHEET GLASS
Filed Feb. 17, 1958 6 Sheets-Sheet 5

INVENTOR.
LLOYD V. BLACK
BY
Oscar L. Spencer
ATTORNEY.

Dec. 18, 1962 L. V. BLACK 3,068,672
APPARATUS FOR BENDING SHEET GLASS
Filed Feb. 17, 1958 6 Sheets-Sheet 6

INVENTOR.
LLOYD V. BLACK
BY Oscar L. Spencer
ATTORNEY.

United States Patent Office 3,068,672
Patented Dec. 18, 1962

3,068,672
APPARATUS FOR BENDING SHEET GLASS
Lloyd V. Black, Murphy, N.C., assignor to Pittsburgh Plate Glass Company, Allegheny, Pa., a corporation of Pennsylvania
Filed Feb. 17, 1958, Ser. No. 715,769
3 Claims. (Cl. 65—268)

This application is a continuation-in-part of my copending applications Serial No. 459,747, filed September 20, 1954, now abandoned, and Serial No. 558,644, filed January 12, 1956, now abandoned, which are copending applications of application Serial No. 238,943, filed July 27, 1951, now U.S. Patent No. 2,736,140, granted February 25, 1956.

This invention relates to apparatus for bending sheet glass, and it has particular relation to the shaping of sheet glass into such complex forms as to be adapted for use in windows which are designed to receive sheet glass curved in conformity with streamlining or other curvatures of window structure in motor vehicles, aircraft, or in any structure in which such glass is applicable.

One object of the invention is to provide improved apparatus by which sheet glass units can be bent during the course of their transportation along a horizontal conveyor system, and wherein flat sheet glass can be bent from a substantially horizontal position partially under the influence of gravity and/or by other forces into the complex shape of the shaping surface of a supporting mold.

Another object of the invention is to provide an improved structure of bending molds which is adapted to bend sheet glass into special forms, particularly to bend the sheet glass in several predetermined areas to relatively sharp curvatures.

Another object of the invention is to provide apparatus for bending glass sheets into special shapes wherein their central regions are bent to gentle curvature flanked by regions of severe curvature.

Another object of the present invention is to provide a novel combination of a stub roll conveyor and a support frame for a glass sheet bending mold supported for movement along said stub roll conveyor.

Still another object of the invention is to provide apparatus for bending glass into complex shapes by conveying flat glass sheets through bending lehrs provided with overhead heaters wherein the conveyor apparatus is so constructed that the central region of the glass may be displaced vertically to below the support level provided for conveying the bending apparatus through the bending lehr.

In bending sheet glass wherein and end portions of glass units, such as those employed in motor vehicles, are to be bent along relatively sharp localized curvatures, difficulty has been experienced in devising molds and other apparatus suitable for producing such localized curvatures in the sheet glass units. Examples of such sharply bent glass units are found in vehicles in the form of rear windows, known as backlights, or in the form of windshields, and/or in other types of windows.

In connection with one of the features of the invention, so-called skeleton molds are so designed that each mold unit is included in a frame structure adapted to travel along a horizontal roll conveyor, the latter of which is so designed as to permit the intermediate portion of the mold to be disposed below the plane of the axes of the rolls of the conveyor. The rows extend across the tunnel and the columns extend longitudinally of the tunnel. In this arrangement, the conveyor includes stub rolls adjacent opposite sides of the conveyor system and the end portions of each mold frame ride horizontally along these rolls which are driven by suitable power means.

The mold frame is provided with a pair of spaced, horizontally disposed support rails so constructed and arranged that laterally opposite sets of stub rolls provide support therefor. The mold provided with the upper shaping surface rests on the mold frame in such a manner that its longitudinal axis is disposed transversely of the support rails of the mold frame. The length of the mold is less than the distance separating the inboard extremities of the laterally opposed sets of stub rolls.

Each mold with a sheet glass unit mounted thereon is transported into a furnace which is heated to proper temperature incidental to the softening of glass, for example, to approximately 1050° F. This furnace is equipped with facilities to apply localized heat at higher temperatures. Electric heating elements can be employed for this purpose so as to direct heat by radiation and in concentrated form to localized areas adjacent the end portions of the sheet glass unit where the sharper bending is to be effected. The concentrated and localized heat is applied at such value as to rapidly increase the temperature in selected areas of the glass unit from approximately 1050° F. to 1200° F. The glass is then immediately bent to the shape of the mold without producing an appreciable transverse curvature, either at the end portions or at the intermediate portions between the sharply bent portions. The concentrated and localized heat is applied only until the glass unit assumes the proper shape. Forces are applied to end portions of the sheet glass unit as a result of peculiarities in the structure and action of the glass supporting mold frame. These forces cooperate with the conveyor system and with the concentrated localized heat to accomplish optimum bending with proper proportions of heat and applied bending forces. The conveyor is operated immediately upon completion of the bending action to transport the glass to a position between upper and lower groups of air jet producing blowers so designed as to apply the air jets at approximately right angles to tangents to the glass curvature substantially at the points of impact of the jets against the glass surfaces.

The conveyor can be so designed and timed in its operation that each glass supporting mold can be transported between these groups of jet blowers at which time the conveyor rolls supporting the mold frame can be stopped for a measured time interval sufficiently long to permit application of chilling air jets upon the surface of the glass. The air jets producing unit oscillates upon eccentric mountings so as to describe a closed or endless path for each jet.

The glass supporting mold is held in proper position between the groups of oscillating jets until the glass becomes case hardened or tempered. Then the conveyor mechanism is operated to move the glass supporting mold forward a predetermined distance to bring it between groups of jet producing nozzles in a cooling unit which merely operates to reduce the temperature of the glass which still retains considerable heat although it had been reduced below the critical annealing temperature by the tempering apparatus. Two or more of these cooling units, which are stationary as distinguished from the oscillatable tempering units, can be disposed along the conveyor system at uniformly spaced intervals beyond the oscillating or tempering unit.

After the glass supporting molds reach the tempering unit the remainder of the conveyor system is operated step by step. For example, when one mold is moved to a position between the upper and lower tempering jets, the next mold which has just preceded it is moved to the first stationary cooling unit. Successive glass supporting molds are thus located at the same time between groups of jets of the oscillating unit, and between the groups of jets of the two stationary cooling units. Each sheet glass unit, therefore, is first subjected to a chilling or tempering treatment, and then to two treatments of cooling air from the two stationary jet producing units in connection with the successive steps of operation of the conveyor system. After the last cooling operation each glass supporting mold is removed or transferred to another conveyor and disposed of as desired. Prior to the present invention, conveyors for tunnel-like bending lehrs have been provided with continuous rolls extending from one side of the lehr to the other side. Glass sheets have been conveyed laterally along such conveyors through regions of successively increasing temperatures in order to attain glass softening temperatures at which time the glass sheets sag to conform to the upper shaping surfaces of bending molds conveyed through such lehrs.

When glass sheets are to be bent to complicated shapes it is necessary for each increment of glass to traverse a temperature path through the lehr that may vary from the temperature paths of other increments. Using continuous rolls in a glass sheet bending lehr inhibits the maintenance of proper thermal gradients along the path of movement of the glass sheet increment, because the center portions of the continuous conveyor rolls underlying the path of movement of the glass sheets are heated by conduction from intensely heated portions of the continuous conveyor rolls and reradiate absorbed thermal energy in an uncontrollable amount toward the increments of glass passing thereover.

By replacing continuous roll conveyors with conveyors provided with stub rolls located beyond the mold and extending inwardly of the lehr walls only sufficiently to support the mold supporting frame, no large metal masses such as are incorporated in the center portions of the continuous rolls are present adjacent the path of movement of the glass sheet increments through the lehr. Therefore, proper thermal gradients can be maintained both longitudinally and transversely of the lehr from its entrance to its exit.

Therefore, each increment of the glass sheet traverses a temperature path during its passage through the lehr most conducive to produce a predetermined complicated bend when the mold support frame is transported along a stub roll conveyor. The temperature control possible in a bending lehr provided with a stub roll conveyor is far more precise than that possible in a lehr provided with a continuous roll conveyor.

FIGURE 3 is a plan view of a frame structure shown in FIGURE 1 with a mold frame in its retracted position;

FIGURE 4 is a plan of the structure shown in FIGURE 3, and including a glass sheet in its final bent form on the mold frame;

FIGURE 9 is a plan similar to FIGURE 1 illustrating another form of frame structure;

FIGURE 10 is a side elevation of the structure shown in FIGURE 9 and also including in broken lines a showing of a mold frame in the position it assumes after the glass sheet thereon has been bent to final form;

FIGURE 11 is an end view, partially in vertical section and partially in elevation, of a mold frame, the section being taken substantially along the line XI—XI of FIGURE 9;

FIGURE 12 is a fragmentary vertical section on a larger scale taken substantially along the line XII—XII of FIGURE 9;

FIGURE 13 is a fragmentary plan on a larger scale, illustrating gauging device structure;

Figure 1:
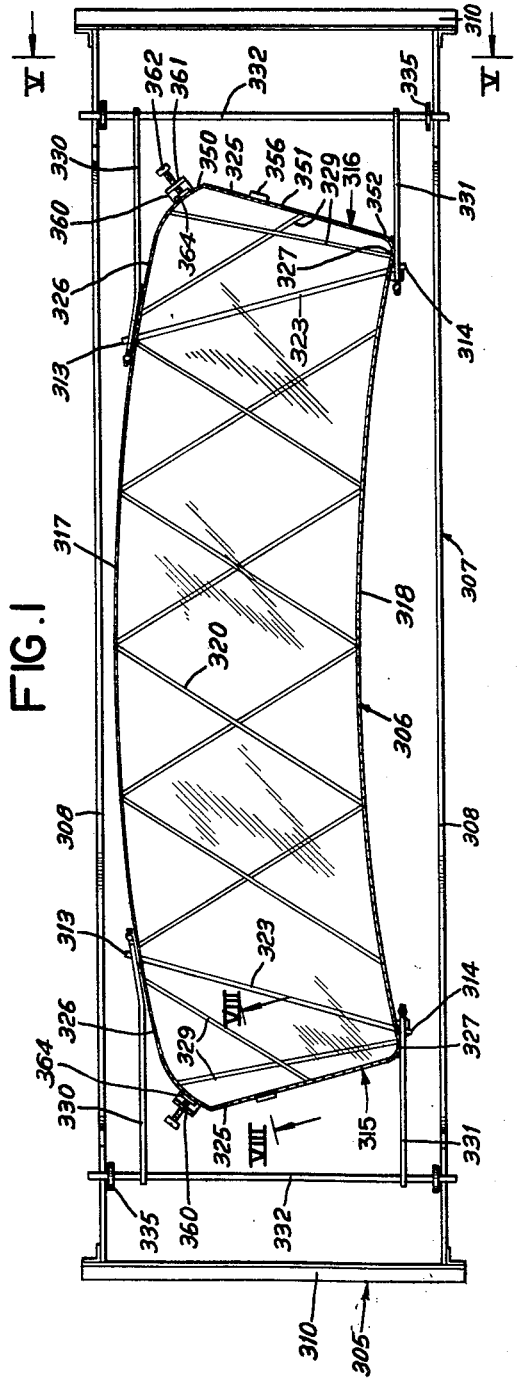
FIGURE 1 is a plan of a frame structure including a cradle and mold frame supported thereon in extended position.

Referring to the drawing, there is provided a conveyor system 10 including a supporting frame structure 12 along which the operations of heating, bending and tempering are accomplished. Stub rolls 13 having annular guide flanges 14 thereon are rotatably mounted in bearings 15 formed in the conveyor frame structure. These rolls are mounted in two rows with their axes disposed horizontally in substantially a common plane. Rolls on opposite sides of the frame are axially aligned and spaced so as to leave an open space between and below the rows of rolls.

Suitable driving mechanism including a driven shaft (not shown) and a sprocket and chain transmission gearing 17 rotates the rolls 13 in the same direction at predetermined peripheral speed. The conveyor system extends into a lehr or furnace 20 which is heated in a conventional manner so as to insure uniformly increased temperatures of values sufficiently high to soften glass. An example of this general type of furnace or lehr, but with a different structure of conveyor rolls is disclosed in U.S. Patent No. 1,638,769.

At the forward end of the furnace 20 an electric heating section 25 is provided. Upper and lower inner walls of this furnace section are provided with refractory channel members 26 and 27 which are disposed linearly with respect to the longitudinal axis of the conveyor. Electric heating elements 28 are mounted in channels 29 of wall portions 26 and 27 and are arranged in rows and columns in spaced relation to the conveyor. A source of electricity in main lines 30 is connected to electric heating elements 28 to supply localized heat energy thereto. Electric control means 31 is connected in each circuit supplying power to each electric heating element 28 from the main lines 30 so as to control the intensity of heat radiated by each heating element. When glass sheets are conveyed transversely through the lehr, each increment of length traverses a unique temperature pattern which causes the glass sheet to sag non-uniformly toward the mold shaping surface.

The bending apparatus comprising the present invention includes a glass supporting frame unit 305. Each frame unit includes a sectional mold frame 306 adjustably and slidably supported upon cradle frame 307. Side bars 308 rigidly secured at their outer opposite ends by means of vertical and horizontal parallel angle iron frame members 309 and 310 form a rigid structure to support the mold frame 306. The lower parallel angle irons 310 are horizontally disposed upon conveyor rolls 13 parallel to the direction of travel of articles transported by the conveyor and serve as runners intermediate the height of the frame unit 305 to move the latter along these rolls. Each mold frame 306, together with its cradle frame 307, is thus supported transversely of the conveyor system with the end portions of the cradle frames resting upon the stub rolls. The intermediate portions of the cradle frame and closed mold frame are suspended between and below the plane of the axes of the stub rolls. The cradle frame is substantially aligned with the mold when the latter is in its closed position. Furthermore, the cradle frame 307 is so constructed that its height does not substantially exceed the depth of the glass bend defined by the closed mold. Since the cradle frame is supported intermediate its height on the stub rolls 13, the height of the lehr tunnel may be minimized to a dimension substantially equal to the depth of glass bend.

In a practical application of the invention each mold frame carries a sheet glass unit 311 which is so mounted and supported upon the mold frame as to facilitate operations of bending and tempering to which such glass is to be subjected in connection with treatment thereof in the furnace 20.

The sectional elements of the mold frame include an intermediate section 312 having hinge connections 313 adjacent one side thereof and additional hinge connections 314 on the opposite side for pivotally joining such intermediate section to outwardly extending end sections 315 and 316. Side rails 317 and 318 of the intermediate sections have upwardly racing curved edges which serve as molding areas of the mold frame. These edges can be serrated or notched, as indicated at 319. Relatively small diagonal rods 320 are rigidly secured, for example by welding at their opposite ends, to the rails 317 and 318 and thus a rigid grill-like intermediate section is provided. In this instance, the rail 317 constitutes the shorter side of the intermediate section and conversely the rail 318 constitutes the longer side of this section.

The mold frame as a unit is normally in a substantially horizontal position or approaches such position, although the relative positions of the mold parts can be varied to a considerable degree. As an example of a type of mold in which the end portions of the oblong glass sheet 311 are to be bent at much sharper curvatures than the intermediate portions, the hinge connections are arranged as shown in the drawings in such manner that the hinge connections 313 are located according to a particular relationship at opposite end portions of the shorter side of the rail 317, and the hinge sections 314 are located adjacent opposite end portions of the longer side rail 318 of the intermediate section. It is to be noted that the hinge connections 314 on the longer side rail 318 are in substantially a horizontal plane offset below the plane of the hinge sections 313 on the shorter side rail 317. It is also to be noted that the two opposite hinge connections 313 and 314 of each pair are not aligned directly across the mold frame but that the hinge connection 313 for the shorter side rail 317 is offset inwardly toward the central portion of the intermediate section 312 with respect to the hinge connection 314 of the longer side 318.

Two rods or bars 323 rigidly join the corresponding end portions of the side rails 317 and 318 and the ends of such rod locate the hinge connections, although the axes of pivoting are not coincident with the longitudinal axis of the rods. The rods 323 are disposed diagonally of the intermediate section and are in substantially converging relation from the ends of the longer side rail 318 toward the ends connecting the shorter side rail 317.

The end sections 315 and 316 comprise rails 325 which are somewhat irregularly U-shaped. One of the legs 326 of each U-shaped rail section has its end located adjacent the end of the shorter side rail 317 and constitutes substantially a continuation thereof. Likewise, the other leg 327 of each end section has its inner extremity located adjacent the longer side rail 318 and constitutes substantially a continuation thereof. The leg 326 is longer than the leg 327 in each end section. The upper edge surfaces of the U-shaped rail 325 are curved according to the curvature to which end portions of the glass sheet are to be bent and are also serrated or notched, as indicated at 328. The overall curvature of the molding surface is concave. The combined upper edge surfaces of the several rails, 317, 318 and 325, constitute molding areas along which the glass sheet conforms in its final bent shape. Crossed bracing rods 329 are also rigidly secured at their outer ends to the rails 325 of the end sections.

Outwardly extending arms 330 and 331 of each end section are rigidly connected by welding or by other suitable means for rigid connection to the outer sides of the rail legs 326 and 327, respectively, of the end sections. These arms are also rigidly connected at their outer ends to transverse rods 332 which are disposed substantially horizontally. The arms 330 and 331 and the rods 332 constitute rigid portions of the end sections. The rods 332 are substantially parallel. However, the arms 330 are longer than the arms 331 and are in such relation as to cooperate properly with the arrangement of the shorter and longer side rails of the intermediate section 312.

Opposite end portions of the rods 332 are slidable upon horizontally disposed guides 334 which are formed as rigid parts of the cradle frame 307. These guides are arranged in pairs adjacent opposite end portions of the crade frame. Stops 335 on the rods 332 prevent the mold frame from shifting laterally, and additional stops 336 on the guides 334 limit horizontal sliding movement of the rods within predetermined limits while permitting longitudinal shifting of the sectional mold with respect to its extending and retracting operations which are made possible by the sectional and hinging character thereof.

The hinge connections 313 and 314 are formed as parts of the extended opposite ends of the diagonal rods 323 although the axis of pivoting of each hinge connection is disposed at an angle to the major or longitudinal axis of the rod 323. Therefore, in establishing the hinge connections among the sections 312, 315, and 316, the inner ends of the arms 330 and 331 are pivotally supported on the outer ends of these rods 323 with the axis of pivoting in each instance disposed in the required angular relation.

Figure 7:
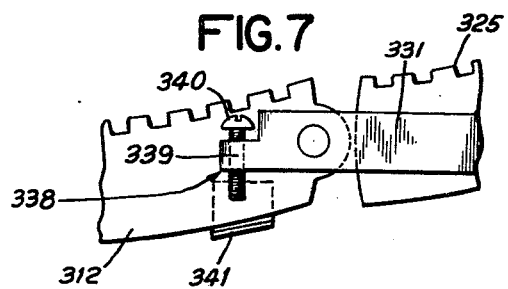
FIGURE 7 is a fragmentary side elevation on a larger scale, of stop device structure to arrest pivotal movement among the sections of the mold frame.
Figure 8:
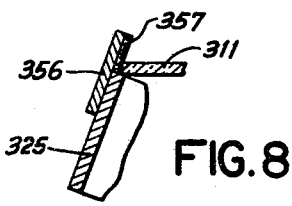
FIGURE 8 is a vertical section on a larger scale taken substantially along the line VIII—VIII of FIGURE 1 to illustrate pusher plate structure at the ends of the mold frame.
Figure 14:
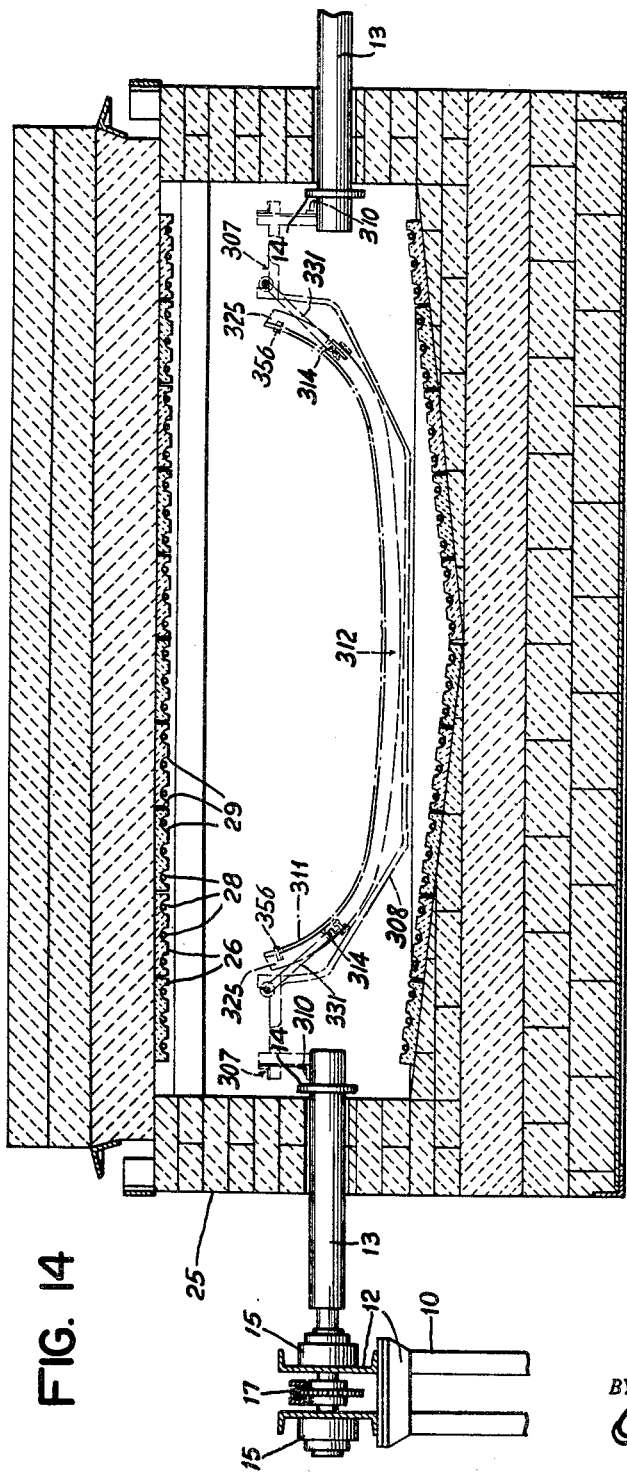
FIGURE 14 is a fragmentary transverse sectional view of a portion of a tunnel-like bending lehr, showing the interrelation of the mold frame, the bending mold, the stub rolls and the heating elements.
Figure 15:
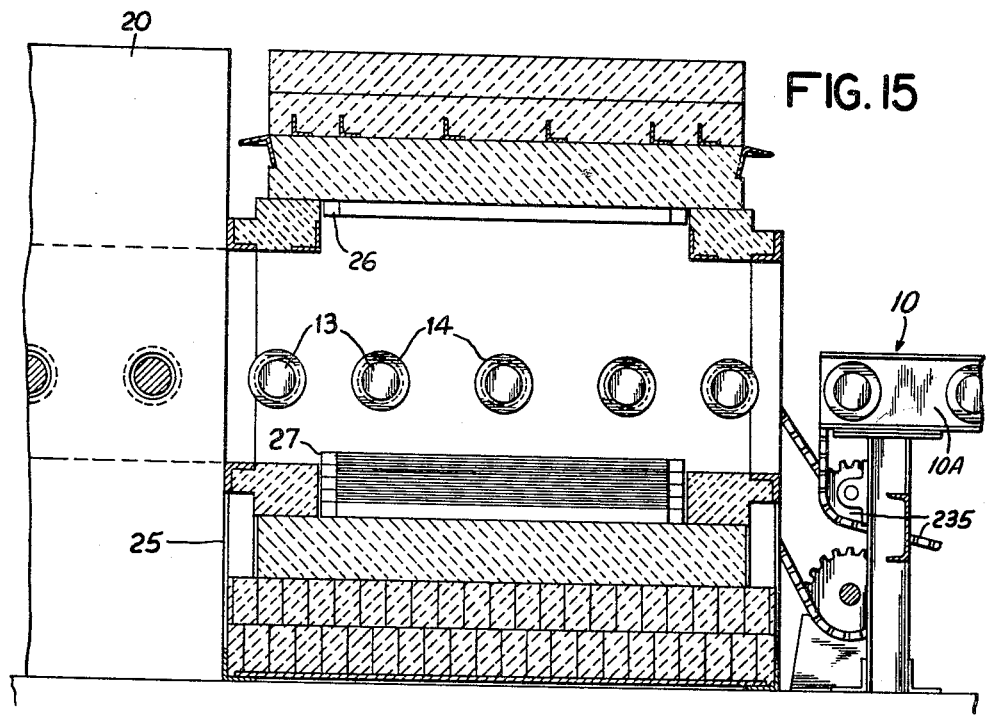
FIGURE 15 is a fragmentary longitudinal sectional view of the portion of the lehr shown in FIGURE 14.
Figure 16:
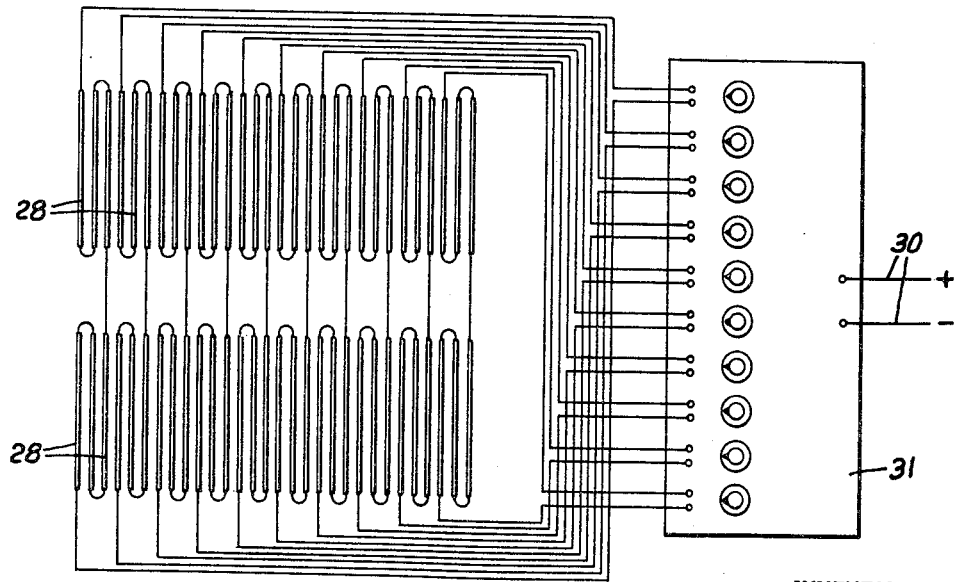
FIGURE 16 illustrates a wiring diagram and indicates electrical control elements for localized heating of portions of a furnace.

In order to control the degree of pivotal movement among the sections 312, 315, and 316 individually adjustable stop devices 338 (FIGURE 7) are mounted adjacent the several hinge connections. Each of these devices 338 includes a rigid flange or extension 339 rigid with the end section structure. These flanges or extensions 339 can be parts of the arms 330 and 331 and are tapped to receive screw bolts 340 threaded therethrough. Stop extensions or flanges 341 formed as rigid parts of the side rails of the intermediate section 312 are aligned in opposed relation to the ends of the several screw bolts 340. By manipulating the stop devices the sections of the mold frame can be precisely adjusted to present the proper curvature along the upper edges of the side rails and end rails to which the glass sheet is to be bent. The bolts 340 can be adjusted so that they individually strike the stop 341 at the same time to limit downward pivotal movement among the sections 312, 315, and 316.

The bolts 340 are so adjusted that they allow the intermediate section 312 to drop sufficiently so that the upper shaping surfaces of side rails 317 and 318 are located below the under surface of support rails 310 before they strike the stops 341. This structural feature results in considerable economy of space required for the tunnel-like lehr through which the molds are conveyed during the bending operation, and, consequently, a saving in power required for the bending operation.

Since the intermediate region of the bent glass sheet supported ultimately by the intermediate mold section 312 is relatively flat compared to the sharply curved regions that flank it, it is desirable to remove the intermediate region as far as possible from the lehr heating elements located overhead in the lehr to minimize heat sagging of the glass in this region. The distance separating the glass from overhead heaters in a bending lehr is important in determining the rate of glass softening, because the intensity of radiation received by the glass varies inversely with the square of the distance from the source of radiant energy. Permitting the intermediate glass regions to sag below the support level defined by the support rails 310 and constructing the carriage frame height to be substantially equal to and vertically aligned with the depth of the bend defined by the closed mold enables the glass bending molds and their carriages to be conveyed through a tunnel lehr of minimum height. Therefore, a minimum volume of air within the lehr is required to be maintained at the elevated lehr temperatures and less power is required to heat the smaller enclosure than is necessary with lehrs comprising higher tunnels.

In one phase of bending glass sheets which in final form are relatively sharply curved at their end portions, for example, glass sheets or plates which serve as windows for certain types of automobiles, the flat blank glass sheet to be bent is somewhat irregular in its shape, as distinguished from rectangular figures. Its end portions are diagonally cut and the corners rounded. The type of mold frame described herein is so designed as to be particularly applicable to bending such special shapes for windows of automotive vehicles.

It is to be noted that the end portions of the mold frame, that is, the outer extremities of the end sections, are formed with outwardly projecting portions 350 which can be termed corner portions although they are rounded. The adjacent rail portion 351 of each end section is curved only slightly and spans the distance between the corner portion 350 and a second corner portion 352, the latter of which is located adjacent the hinge connection 314. The corner portion 352 is also spaced farther inwardly toward the central portion of the mold frame. The rounded corner 352 is disposed at the outer end of the shorter extension or leg 327 of the rail 325, so as to be located in end to end relation to the adjacent longer side 318 of the intermediate section. The projection or rounded corner 350 is a continuation of the longer leg 326 which is aligned in end to end relation with the shorter side rail 317 of the intermediate section.

Each end portion of the mold frame in plan view therefore, presents a slightly curved and somewhat diagonal rail section between the rounded corners 350 and 352.

Relatively small plates 356 are rigidly mounted between the rounded corners 350 and 352 on each end section. These plates are faced with insulating material, for example, relatively small pieces of asbestos 357 in sheet form. Opposite end edges of the glass sheet 311 are confined between these plates 356 which serve as pushers during bending operations.

In order to place a glass sheet upon the mold frame, the sections are spread or extended lengthwise. This spreading or extension of the mold can be accomplished by applying a suitable tool, such as a bar, on one of the end rods 332 with the inner end of the bar disposed underneath the adjacent end section. The rod 332 serves as a fulcrum and the mold sections can thus be lifted and spread to the desired position. The horizontal rods 332 in such spreading action slide outwardly upon the guides 334 and the pusher plates 356 are moved away from each other a sufficient distance to receive the edges of glass sheet. Adjustable gauges 360 mounted upon the rails 325 of the end sections are adjustable toward and away from the edges of the glass sheet. Such gauges can be set according to the position the glass sheet is to assume in mounting it upon the mold frame and prevents the glass from shifting incidental to the initiation of the bending operation. Each of these gauges comprises a bracket 361 rigidly mounted upon the rail 325 of the end section and a screw bolt 362 which is threaded through the plate. The inner end of the screw bolt 362 has a small plate or disk 364 mounted thereon for slight pivotal movement in order that it may conform to the edge of the glass sheet when the latter is mounted upon the frame.

The hinge connection 313 and 314 are so arranged as described above that the area of each of the end sections between the curved corner portions 350 and 352 assumes a position slightly deviating from horizontal when the mold sections are spread or extended to receive the unbent glass sheet.

An alternate form of structure for a sectional mold frame 370 is carried in a cradle frame 371 which is substantially the same in arrangement as the cradle frame 307 and is provided with horizontal and parallel angle gars 310A which travel on the stub rolls 13 in the same manner as the angle irons 310. The mold frame 370 includes an intermediate section 372 and end sections 374 extending from opposite extremities thereof.

Hinge connections 375 at opposite end portions of the intermediate section include the extremities of substantially parallel rods 376 which are rigidly secured to the opposite end portions of the intermediate section 372. The mold frame 370 is somewhat similar in structure and general arrangement to the structure previously described with the exception that a plan view (FIGURE 9) of the mold frame 370 is substantially rectangular in appearance and the pivotal connections of the mold frame 370 are not offset or disposed at different elevations as is the case with reference to the structures shown in FIGURES 1 to 8. Side rail 380 which are substantially parallel along opposite sides of the intermediate section 372 have upwardly facing edges to receive the marginal portions of a glass sheet in supporting it. Relatively small diagonal bracing rods 381 are rigidly secured, for example by welding at their opposite ends to the rails 380 and thus provide a rigid grill-like intermediate section. In this arrangement, the side rails 380 are substantially the same length.

The mold frame 370 as a unit is normally in a horizontal position or approaches such position, although the pivotal relationship among the mold parts can be varied to a considerable degree with regard to the angular movement of the sections about the hinge connections 375.

The end sections 374 comprise rails 382 which are substantially U-shaped. Inwardly extending legs 383 of the U-shaped rails are arranged in slightly spaced end-to-end relationship to the side rails 380 and in effect constitute continuations thereof. The upper edges of these U-shaped rails are curved according to the curvature to which the end portions of a glass sheet 384 are to be bent. The overall curvature of the molding surfaces along the upper edges of the intermediate rails and end rails 383 is concave and the upper edges of these rails are serrated or notched, as indicated at 385.

Outwardly extending arms 386 of each end section are rigidly connected by welding or by other suitable rigidly securing means to the outer sides of the rail legs 383. These arms are also rigidly connected at their outer ends to transverse rods 387 which are disposed substantially horizontally. They are also parallel to each other. The arms 386 and the rods 387 constitute rigid portions of the end sections and these sections also include transverse bracing rods 388 rigidly secured thereto.

Opposite end portions of the rods 387 are slidable upon horizontally disposed guides 390 which are formed as rigid portions of cradle frame 371. These guides are arranged in pairs adjacent opposite end portions of the cradle frame. Stops 391 in the form of plates or disks are mounted rigidly upon the rods 387 to prevent the mold frame from shifting laterally. Additional stops 392 on the upper sides of the guides 390 limit horizontal sliding movement of the rods within predetermined areas by permitting longitudinal shifting of the sectional mold frame 370 with respect to its extending and retracting operations which are made possible by the mounting and sectional hinging character thereof.

In order to control the degree of pivotal movement among the sections 372 and 374, individual stop devices 395 are installed in connection with the several hinge connections 375. Each of these stop devices includes a rigid flange or extension 396 rigid with the end section structure. These flanges or extensions 396 can be parts of the arms 386 and they are tapped to receive screw bolts 397 threaded therethrough. Stop extensions or flanges 398 formed as rigid parts of the end portions of the side rails 380 are aligned in opposed relation to the ends of the screw bolts 397. By manipulating the stop devices, the sections of the mold frame 370 can be precisely adjusted to present the proper curvature along the upper edges of the side rails and end rails to which the glass sheet is to be bent. The bolts 397 can be adjusted so that they individually strike the stops 398 at the same time to limit downward pivotal movement among the sections 372 and 374.

Bolts 397 are adjusted to strike the stops 398 only after the rails 380 drop below the support level provided by the bottom surface of rails 310a which ride the lehr conveyor stub rolls. The phantom lines of FIGURE 10 show this feature clearly. Thus, this species provides the benefits obtainable with such structure already described for the species depicted in FIGURES 1 through 8 of the drawings.

Relatively small plates 400 are rigidly mounted at the outer extremities of the end sections 374 in such position that the upper edges of the rails 382 on the inner sides of the plates are exposed to support the end portions of the glass sheet 384. These plates are faced on their inner sides with a cushioning layer 401 of heat resisting material such as asbestos. In order to place the glass sheet 384 upon the mold frame, the hinged sections 372 and 374 are spread or extended lengthwise. This manipulation can be accomplished by applying a suitable tool, such as a bar on one of the rods 387 with the inner end of the bar disposed underneath the adjacent end section. The rod 387 serves as a fulcrum and by forcing the outer end of the bar downward the sections can thus be spread to the desired position to receive the glass. The horizontal rods 387 in such spreading action slide outwardly and horizontally upon the guides 390 and the plates 400 are moved away from each other a sufficient distance to receive the end edges of the glass sheet. The intermediate portion of the sectional mold frame is raised during this operation of positioning the glass sheet thereon. The weight of the glass and the mold frame under the action of gravity exert considerable inward pressure upon the end portions of the glass as these sections tend to pivot to a lower position at which the bolts 397 engage the plates or stops 398.

Adjustable gauges 402 mounted upon the rails 382 are adjustable toward and away from the edges of the glass sheet so as to insure proper positioning of the glass above the rail preparatory to the bending operations. Each of these gauges includes a bracket plate 403 mounted rigidly upon the rail 383 of the end section to receive a screw bolt 404 which is threaded through the bracket plate. The inner end of the screw bolt has a small plate or disk 405 mounted thereon for slight pivotal movement in order that it may adapt itself evenly to the edge of the glass sheet when applied thereto. After the glass has been positioned as indicated, the mold frame together with the cradle frame is transported through heated zones of the furnace 20.

Figure 2:
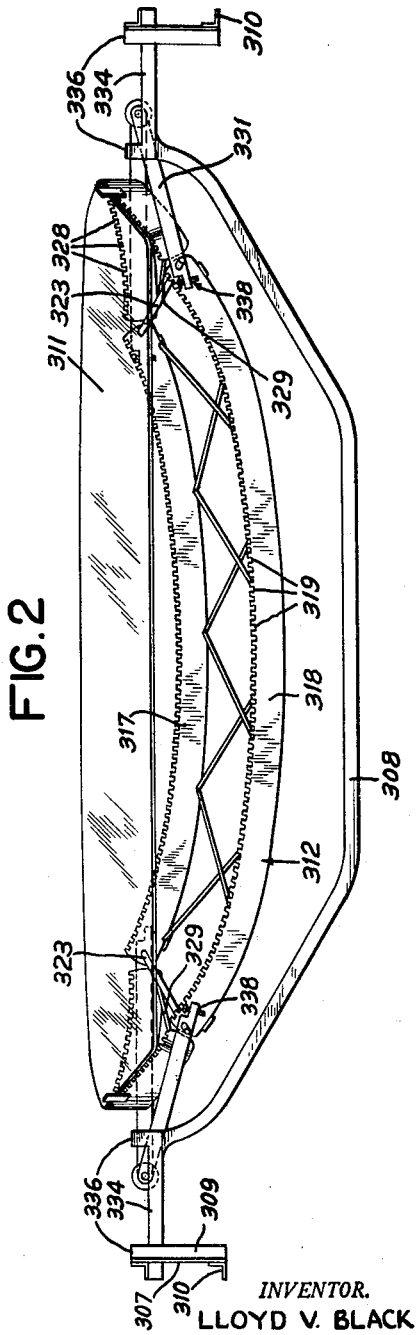
FIGURE 2 is a side elevation of the structure in FIGURE 1.
Figure 5:
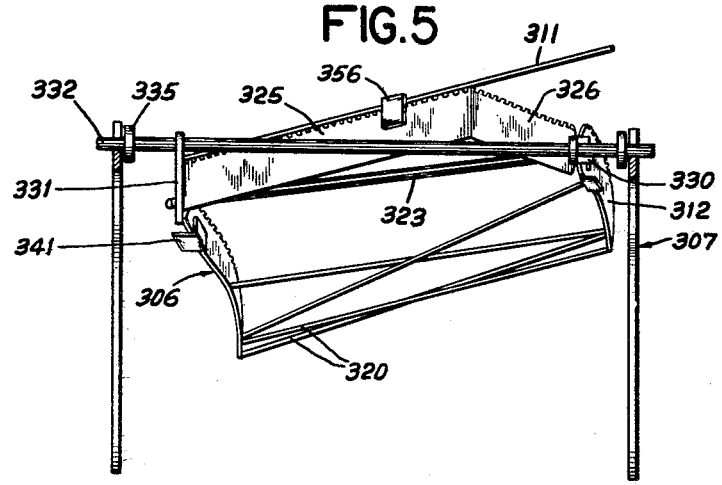
FIGURE 5 is an end view, partially in vertical section and partially in elevation, the section being taken substantially along the line V—V of FIGURE 1.
Figure 6:
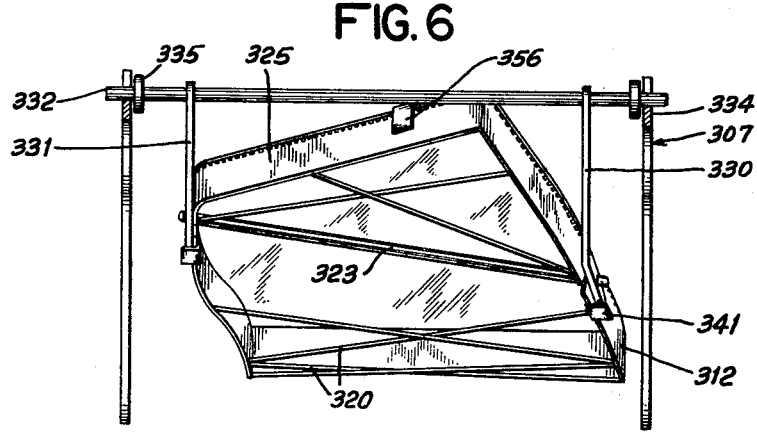
FIGURE 6 is an end view similar to FIGURE 5 including a vertical section taken substantially along the line VI—VI of FIGURE 3.

In reviewing the operation of the apparatus described above several of the frame units 305 are spaced along the length of a horizontally disposed stub roll conveyor with each unit including a mold frame 306 having a sheet of glass mounted thereon. As seen in FIGURE 2, laterally opposed stub rolls 13 extend inwardly toward each other to terminate at their inboard extremities outboard of the mold 306 and sufficiently inwardly to support frame unit 305 along its support rails 310.

As the glass supporting unit proceeds along the conveyor the heat in a furnace through which the glass is carried raises the temperature in the glass sheet 311 to a value of approximately 1050° F. This temperature is such that the glass is almost ready to begin its initial bending and is being softened. Then the frame mold is moved to a position between upper and lower electric heating elements which are energized in such manner as to apply increased localized heat adjacent the extremities of the glass sheet and in the neighborhood of the hinge connections 313 and 314. This is accomplished by energizing heaters in the columns of heaters irradiating the paths traversed by said hinge connections to a greater degree than the other heaters in the same row of heaters. The increased temperature in the glass in these localized areas permits the glass to bend downward partially under the influence of its own weight plus the forces applied to the ends of the glass unit by the weight of the mold frame as the sections thereof collapse downwardly until the stop devices 338 arrest the downward and pivotal movement of these sections. Concurrently with this movement the end portions on the guides slide inwardly. Considerable pressure is thus exerted upon opposite extremities of the glass sheet by the plates 356 thereby expediting the bending of the glass adjacent its end portions to conform to the sharper curvatures of the end portions of the mold frame.

Since the central portion of the glass unit has not been heated as rapidly as the end portions, the glass will not bend as quickly in this area along the central section of the mold frame whose curvature is much less sharp than the curvatures at the end portions thereof. In this manner the marginal portions of the glass sheet reach the upper edges of the molding surfaces of the central section 312 and end sections 315 and 316 at approximately the same time.

The central portion of the glass actually does not begin to bend appreciably until considerable bending has taken place in the end portions that flank the opposite extremities of the central portion. By regulating the bending forces and heat energy in the manner specified, transverse bending or sagging in the glass is reduced to a minimum. If the glass softening heat were applied uniformly over the entire area of the glass the bending would occur too early in the intermediate section and before the end sections could assume their sharply bent contour. Under such conditions the central portion of the glass would prematurely reach the upwardly facing molding edges of the side rails 317 and 318 and thereafter the bending would continue transversely of these rails until the completion of the sharp curvatures at the end portions of the glass. It is therefore important that the applied heat and the rates of bending be regulated differentially with reference to the central and end portions of the glass so as to insure substantially concurrent completion of the bending action throughout the areas of the glass. Likewise, these factors are so coordinated that the completion of this bending action occurs substantially at the time the stop devices 338 arrest the collapsing or pivoting action of the mold. There is not as much tendency of the glass to bend or sag transversely in the areas between the legs 326 and 327 of the end sections where the heat is concentrated, because the bending action occurs relatively rapidly in these locations and also because the bent end portions assume a relatively steep upwardly sloping position which lessens the tendency to sag.

The central region of the glass drops a substantial distance below the overhead lehr heaters by virtue of the sharp localized bending in the regions immediately flanking the central regions. In fact, the central region is displaced to below the carriage support level defined by the rails 310 or 310a before the movement of the sectionalized mold to a closed position is arrested by the action of stop devices 338 or 397, 398. This separation of the central region of the glass sheet from the overhead heaters minimizes heat sagging in this region.

As soon as the bending operation has been completed the frame unit with the glass sheet thereon is moved to a position between upper and lower jet tubes which are movable in closed patterns relative to the glass sheet. While the glass is still heated to softening temperature, the jet directing nozzles apply jets of air upon opposite sides of the glass sheet and during this application the nozzles move relative to the glass in the manner described above. At the curved end portions of the glass, it is to be noted that the nozzles are directed toward the curvature of the glass in such manner as to strike the glass surface substantially at right angles to tangents to the curvatures at points on the glass surface nearest the discharge of the individual nozzles. In this way the most advantageous tempering effect can be realized from the air jets.

After the tempering operation, the glass still retains considerable heat below annealing temperatures which can be dissipated in the operation of succeeding units. The temperature in the glass is thus reduced to a value sufficiently low to permit handling thereof without inconvenience.

When glass sheets are to be bent in stacked pairs prior to their lamination, only overhead heaters are employed to heat the upper sheet more intensely than the bottom sheet, thereby insuring that the upper sheet remains in more intimate contact with the bottom sheet throughout the bending cycle. In this instance also, the presence of continuous rolls disrupts the unique heating pattern required for each increment of glass sheet length conveyed transversely through the bending lehr because the temperature of the rolls tends to equalize along their lengths by thermal conduction and the rolls reradiate thermal energy onto the bottom sheet of the stack, thus tending to heat soften the bottom sheet more rapidly than the top sheet and causing the sheets to separate. When employing stub rolls, the floor of the lehr is of refractory material having relatively low heat conductivity compared to metal. Therefore, the thermal patterns intersected consecutively by the laterally disposed glass sheets are more readily controlled when a stub roll conveyor is employed rather than a continuous roll conveyor.

Although considerable structural arrangements involving the invention have been shown and described in detail, it will be apparent to those skilled in the art that the invention is not so limited but that various changes can be made therein without departing from the spirit and/or scope of the invention as exemplified in the appended claims.

What is claimed is:
1. Apparatus for bending elongated glass sheets to non-uniform curvatures comprising an elongated skeletonized bending mold of given length having a skeleton curved shaping surface disposed substantially horizontally for supporting a glass sheet adjacent its periphery only, a skeleton support frame on which said mold is mounted, said frame comprising a pair of longitudinally spaced, horizontally disposed support rails attached to said support frame and extending transversely thereof longitudinally outwardly of each end of said skeleton shaping surface, a tunnel-like bending lehr comprising upper and lower inner walls, a conveyor extending longitudinally of said tunnel-like lehr and comprising laterally opposed sets of stub rolls located intermediate said upper and lower inner walls, said stub rolls having inboard extremities separated from each other a distance greater than the length of said mold and less than the distance between said horizontally disposed support rails to define a space of greater width than the length of said skeleton mold between said inboard extremities, said stub rolls supporting said support rails while conveying said mold transversely along said space, heaters mounted on said upper inner wall and disposed in rows extending across the lehr and columns extending longitudinally of the lehr to radiate heat downwardly toward a glass sheet carried by said mold as it traverses said space, and control means operatively connected to each heater to control its thermal output, thereby providing a succession of thermal patterns intersecting the path of movement taken by the glass sheet through the lehr, whereby each increment of length of glass sheet traverses a controlled temperature pattern free from deviations that would result if continuous rolls were employed instead of stub rolls.

2. Apparatus as in claim 1, further including additional heaters mounted on said lower inner wall and disposed to radiate heat upwardly toward the glass sheet carried by said mold.

3. Apparatus as in claim 1, wherein said mold comprises an intermediate mold section and hinge connections adjacent each side of said intermediate mold section in the neighborhood of spaced regions of severe curvature and end mold sections pivotally attached to said intermediate mold section through said hinge connections.

References Cited in the file of this patent

UNITED STATES PATENTS

| | | |
|---|---|---|
| 1,791,404 | Fahrenwald | Feb. 3, 1931 |
| 1,819,509 | Harris | Aug. 18, 1931 |
| 1,840,661 | Fahrenwald | Jan. 12, 1932 |
| 2,646,647 | Bamford et al. | July 28, 1953 |
| 2,671,987 | Jendrisak | Mar. 16, 1954 |
| 2,671,988 | Walters | Mar. 16, 1954 |

FOREIGN PATENTS

| | | |
|---|---|---|
| 805,248 | France | Aug. 22, 1936 |

UNITED STATES PATENT OFFICE
CERTIFICATE OF CORRECTION

Patent No. 3,068,672 December 18, 1962

Lloyd V. Black

It is hereby certified that error appears in the above numbered patent requiring correction and that the said Letters Patent should read as corrected below.

Column 5, line 23, for "racing" read -- facing --.

Signed and sealed this 7th day of April 1964.

(SEAL)
Attest:

ERNEST W. SWIDER

Attesting Officer

EDWARD J. BRENNER

Commissioner of Patents